US010331090B2

(12) United States Patent
Takami et al.

(10) Patent No.: US 10,331,090 B2
(45) Date of Patent: Jun. 25, 2019

(54) INFORMATION PROCESSING SYSTEM, INFORMATION PROCESSING METHOD, AND RECORDING MEDIUM

(71) Applicant: Yokogawa Electric Corporation, Tokyo (JP)

(72) Inventors: Go Takami, Tokyo (JP); Hiroaki Kanokogi, Tokyo (JP)

(73) Assignee: Yokogawa Electric Corporation, Musashino-shi, Tokyo (JP)

( * ) Notice: Subject to any disclaimer, the term of this patent is extended or adjusted under 35 U.S.C. 154(b) by 0 days.

(21) Appl. No.: 15/729,810

(22) Filed: Oct. 11, 2017

(65) Prior Publication Data

US 2018/0101148 A1    Apr. 12, 2018

(30) Foreign Application Priority Data

Oct. 12, 2016    (JP) .................................. 2016-201072

(51) Int. Cl.
G05B 13/02    (2006.01)
G06F 17/18    (2006.01)
G05B 23/02    (2006.01)
G05B 13/04    (2006.01)

(52) U.S. Cl.
CPC ....... *G05B 13/027* (2013.01); *G05B 13/0265* (2013.01); *G05B 13/04* (2013.01); *G05B 23/02* (2013.01); *G06F 17/18* (2013.01)

(58) Field of Classification Search
CPC .. G05B 13/027; G05B 13/0265; G05B 13/04; G05B 23/02; G06F 17/18
USPC .......................................................... 706/23
See application file for complete search history.

(56) References Cited

U.S. PATENT DOCUMENTS

| 8,554,706 B2* | 10/2013 | Hayashi | G05B 13/027 706/16 |
| 2005/0233742 A1* | 10/2005 | Karaoguz | H04L 29/06027 455/432.3 |
| 2007/0198115 A1* | 8/2007 | Krien | G01B 11/22 700/98 |
| 2013/0103345 A1* | 4/2013 | Krien | G01B 11/22 702/155 |

(Continued)

FOREIGN PATENT DOCUMENTS

| JP | 2016-162437 A | 9/2016 |
| JP | 2016164772 A | 9/2016 |

(Continued)

OTHER PUBLICATIONS

Go Takami, et al., "Machine Learning Applied to Sensor Data Analysis", Yokogawa Technical Report, 2016, pp. 27-30, vol. 59, No. 1.

*Primary Examiner* — Fernando Hidalgo
(74) *Attorney, Agent, or Firm* — Sughrue Mion, PLLC

(57) ABSTRACT

An information processing system includes a state data acquisition device configured to acquire state data indicating an operation state of a plant, a first classification device configured to generate a determination line used to classify the state data, a mirror image data generation device configured to generate mirror image data obtained by mirroring the acquired state data using the generated determination line, and a second classification device configured to generate a determination model on the basis of the state data and the generated mirror image data.

10 Claims, 16 Drawing Sheets

(56) References Cited

U.S. PATENT DOCUMENTS

2013/0185013 A1\* 7/2013 Wagner ............... G01D 18/008
702/104

FOREIGN PATENT DOCUMENTS

| WO | 2010/007138 A2 | 1/2010 |
| WO | 2014/014377 A1 | 1/2014 |

\* cited by examiner

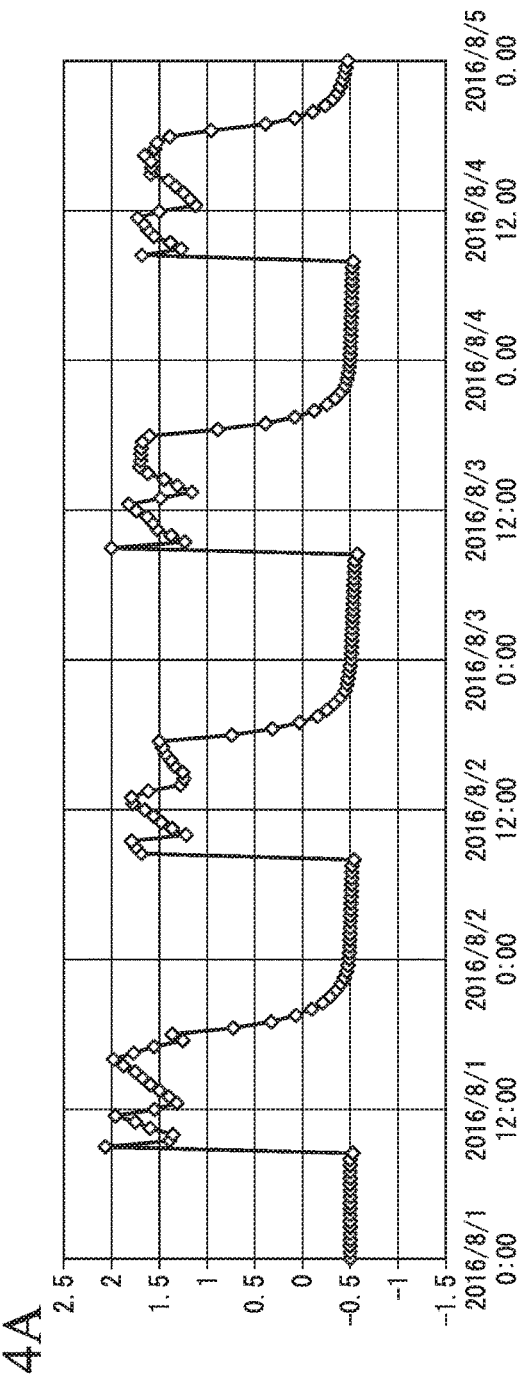
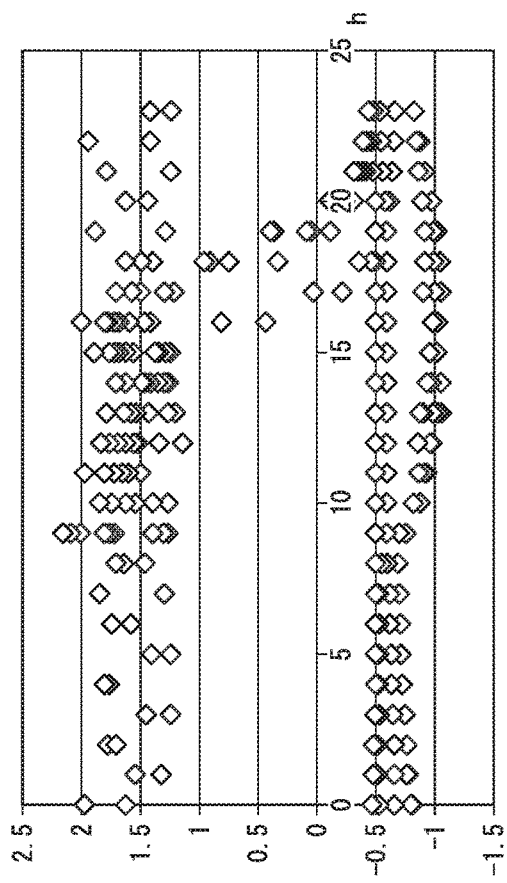
FIG. 4A
FIG. 4B

INFORMATION PROCESSING SYSTEM, INFORMATION PROCESSING METHOD, AND RECORDING MEDIUM

BACKGROUND

Technical Fields

The present invention relates to an information processing system, an information processing method, and a recording medium.

Priority is claimed on Japanese Patent Application No. 2016-201072, filed Oct. 12, 2016, the contents of which are incorporated herein by reference.

Related Art

In the related art, industrial plants such as chemical, plants which manage and control well sites such as gas wells and oil wells and the vicinity thereof, plants which manage and control hydraulic power generation, thermal power generation, nuclear power generation, and the like, plants which manage and control environmental power generation such as solar power generation and wind power generation, and plants which manage and control water supply and sewage, dams, and the like, and factories (hereinafter collectively referred to a "plant") have been utilized, distributed control systems (DCS) in which site devices such as measuring devices or operating devices referred to as field devices and a control device configured to control these are connected with communication means have been constructed, and an advanced automatic operation has been realized.

In systems and the like of plants constructed to realize the above-described advanced automatic operation, data indicating plant states such as a yield, operating conditions, and alarm occurrence states of the plants are obtained by measurement using sensors and measuring devices disposed in the plants. Data obtained by measurement using sensors and the like is acquired by control devices such as DCSs and is used to control the plants.

Also, there is a technique of applying machine learning to data acquired from a sensor and the like disposed in a plant and controlling the plant. Machine learning in plant control includes, for example, a learning step of generating a model using data acquired from the sensor and the like as learning data and an evaluation step of evaluating state data using the generated model (for example, refer to Go TAKAMI et al. (3), "Machine Learning Applied to Sensor Data Analysis," Yokogawa Technical Report, Yokogawa Electric Corporation, Vol. 59 No. 1 (2016) p. 27 to 30).

However, in machine learning, a model generated on the basis of learning data strongly depends on situations, conditions, and the like in which the learning data is acquired. For example, when measurement data of a sensor or the like disposed in a plant is set to be learning data, the generated model strongly depends on the usage situation and installation conditions of the sensor, the deterioration state of the sensor itself, and the like. Therefore, a model generated using measurement data of one sensor as learning data may not be able to be used as it is for evaluating measurement data of another sensor having a different sensor usage situation in some cases.

When the generated model cannot be used as it is, for example, the generated model can be artificially modified to be used to determine measurement data of another sensor in some cases. However, when it is difficult to objectively digitize differences between usage situations or the like of the sensors, it may be difficult to artificially modify the generated model in some cases.

Also, when the generated model cannot be used as it is, a model can be newly generated using measurement data of another sensor as learning data. However, in order to generate a model for each sensor, a learning step is required for each sensor and it takes time and costs are incurred to generate the model in some cases.

SUMMARY

An information processing system may include a state data acquisition device configured to acquire state data indicating an operation state of a plant, a first classification device configured to generate a determination line used to classify the state data, a mirror image data generation device configured to generate mirror image data obtained by mirroring the acquired state data using the generated determination line, and a second classification device configured to generate a determination model on the basis of the state data and the generated mirror image data.

Further features and aspects of the present disclosure will become apparent from the following detailed description of exemplary embodiments with reference to the attached drawings.

BRIEF DESCRIPTION OF THE DRAWINGS

FIGS. 4A and 4B are diagrams illustrating an example of set conversion of state data in the information processing system according to the embodiment.

DETAILED DESCRIPTION OF THE EMBODIMENTS

The embodiments of the present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

An aspect of the present invention is to provide an information processing system, an information processing method, and a recording medium which generate a determination model used to determine operating conditions of a plant using machine learning and have high versatility.

An information processing system, an information processing method, and a recording medium according to an embodiment of the present invention will be described in detail below with reference to the drawings.

Figure 1:
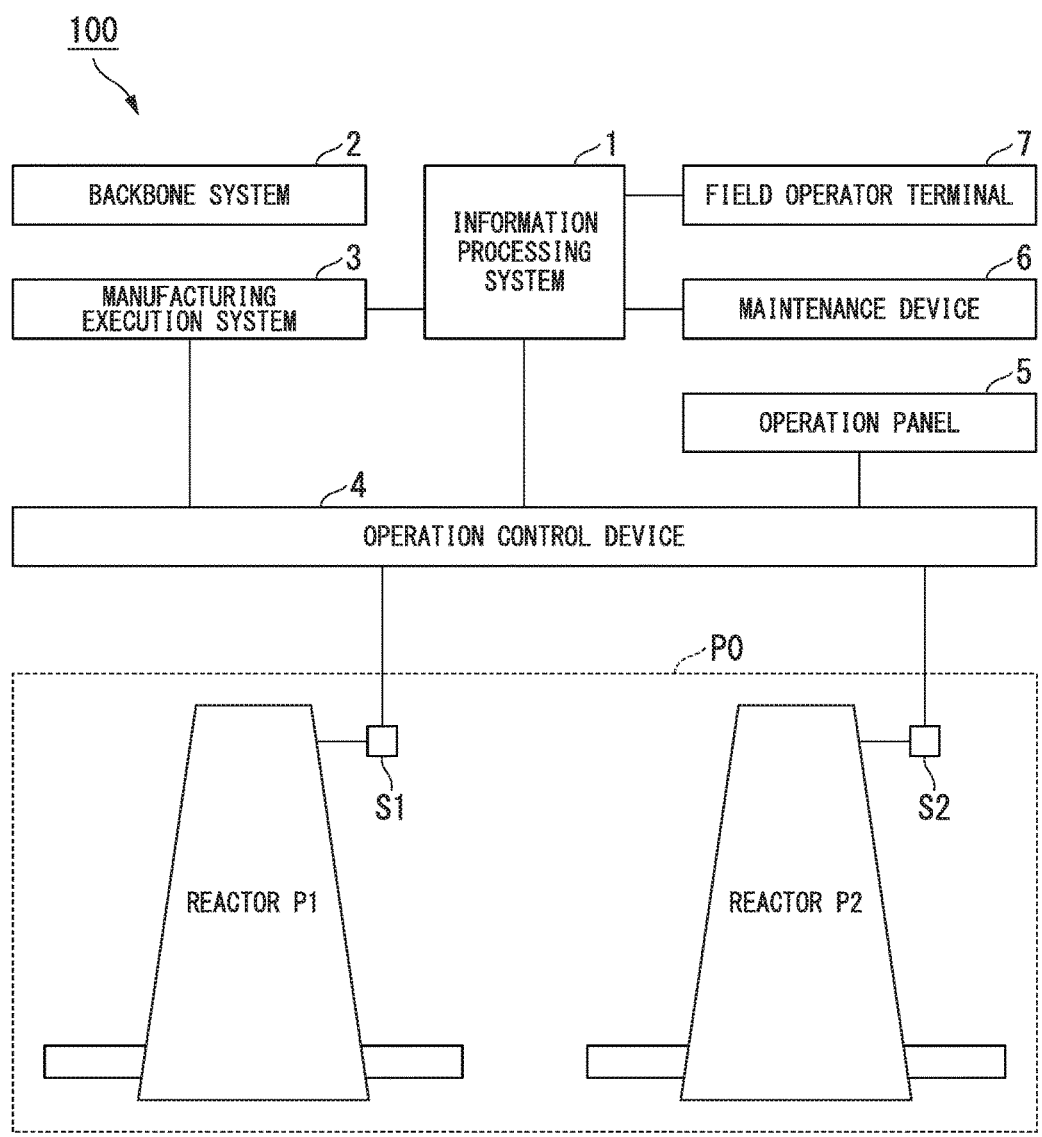
FIG. 1 is a diagram illustrating an example of a constitution of a plant using an information processing system according to an embodiment.

First, an overview of a plant using an information processing system will be described using FIG. 1. FIG. 1 is a diagram illustrating an example of a constitution of a plant using the information processing system according to the embodiment. In FIG. 1, a plant 100 includes an information processing system 1, a backbone system 2, a manufacturing execution system 3, an operation control device 4, an operation panel 5, a maintenance device 6, a field operator terminal 7, and a plant device P0. The plant device P0 includes a reactor P1, a sensor S1, a reactor P2, and a sensor S2. The plant device P0 produces a predetermined product (product).

The reactor P1 is, for example, a device configured to cause chemical reaction of input materials to produce a product. The sensor S1 obtains state data indicating operation states of the reactor P1 by measurement. The state data indicating operation states of the reactor P1 includes, for example, data of physical quantities such as a pressure, a temperature, a pH, and a flow rate of a product inside the reactor P1. The sensor S1 is an input device configured to input the measurement state data of the reactor P1 to the operation control device 4.

The sensor S2 obtains state data indicating operation states of the reactor P2 by measurement. In the embodiment, it is assumed that the reactor P2 is a reactor which is similar to the reactor P1 and produces a product which is similar to that of the reactor P1. Furthermore, it is assumed that the sensor S2 obtains the same state data as the sensor S1 (for example, a temperature) by measurement. On the other hand, since the sensor S2 is attached to the reactor P2, measurement data of the sensor S2 is different from that of the sensor S1 attached to the reactor P1. Furthermore, installation times and operation rates of the sensor S2 are different from those of the sensor S1 and thus degrees of deterioration of the sensors are likely to differ.

The information processing system 1 acquires state data of the plant device P0 obtained by measurement by the sensor S1 or the sensor S2. The information processing system 1 performs learning with the acquired state data to generate a determination model and performs determination for the acquired state data using the generated determination model. The information processing system 1 may output the determined determination result to the manufacturing execution system 3, the operation control device 4, the maintenance device 6, and the field operator terminal 7. Note that details of an operation of the information processing system 1 will be described below.

Although a case in which the plant device P0 includes the reactor P1, the sensor S1, the reactor P2, and the sensor S2 has been described with reference to FIG. 1, a device constitution of the plant device P0 is not limited thereto, and for example, the plant device P0 may be a device including a unit such as tanks, valves, pumps, and other sensors. The sensor S1, the sensor S2, a valve, a pump, or the like included in the plant unit P0 is referred to as a "field unit." Furthermore, lines used to connect the devices or the devices illustrated in FIG. 1 are wired or wireless communication lines. Wired communication or wireless communication may be performed over communication devices and networks (which are not shown).

The backbone system 2 is, for example, an enterprise resource planning (ERP: management resource integration) system configured to manage management resources such as accounting processing, production management, and sales management. The backbone system 2 may use information on operation states of the plant as management information on management resources. Furthermore, the backbone system 2 may include a maintenance management system and the like configured to manage business information on maintenance and repair of the plant. The backbone system 2 is, for example, a general-purpose computer such as a server device and a desktop type personal computer (PC).

The manufacturing execution system 3 is, for example, a manufacturing execution system (MES) located between the backbone system 2 and the operation control device 4 and monitors or manages operating states of the plant device P0, a working state of an operator, and the like acquired by the operation control device 4. The manufacturing execution system 3 acquires a determination result determined in the information processing system 1 and outputs an operation instruction used to operate the plant device P0 on the basis of the determination result to the operation control device 4. The manufacturing execution system 3 is, for example, a general-purpose computer such as a server device and a desktop type personal computer PC.

The operation control device 4 controls a pump or a valve (which are not shown) on the basis of the state data of the reactor P1 acquired from the sensor S1 and controls generation of a product in the reactor P1. Furthermore, the operation control device 4 controls a pump or a valve (which are not shown) on the basis of the state data of the reactor P2 acquired from the sensor S2 and controls generation of a product in the reactor P2. The operation control device 4 outputs the state data of the reactor P1 acquired from the sensor S1 and the state data of the reactor P2 acquired from the sensor S2 to the information processing system 1. The operation control device 4 may acquire a determination result determined in the information processing system 1 and control the plant device P0 on the basis of the determination result. The operation control device 4 is, for example, a device such as a factory automation (FA) computer and a programmable logic controller (PLC).

The operation panel 5 is a device in which a field operator in the plant monitors operating states of a field device and operates a field device. The operation panel 5 includes, for example, display devices such as lamps and displays or operating devices such as push button switches and keyboards. In the embodiment, the operation panel 5 may acquire a determination result determined in the information processing system 1 and display the determination result.

The maintenance device 6 is a device by which a field operator performs maintenance on a field device. The maintenance of a field device includes, for example, a process of reading and checking device information set for a field device, a process of setting new device information (parameters) for a field device, a process of adjusting or changing the device information set for a field device, a process of setting the device information for a field device and causing a field device to perform a predetermined operation, and the like. The maintenance device 6 may transmit state data obtained offline from a field device to the information processing system 1. Furthermore, the maintenance device 6 may acquire a determination result determined in the information processing system 1 and display the determination result. The maintenance device 6 is a notebook type or tablet type computer, a personal digital assistant (PDA), a smartphone, or the like.

The field operator terminal 7 is a terminal device carried by a field operator. The field operator terminal 7 may acquire a determination result determined in the information processing system 1 and display the determination result. The field operator terminal 7 is a notebook type or tablet type computer, a PDA, a smartphone, or the like.

The information processing system 1 communicates with the manufacturing execution system 3, the operation control device 4, the maintenance device 6, and the field operator terminal 7. The information processing system 1 acquires state data of the sensor S1 and the sensor S2 from the operation control device 4 or the maintenance device 6. The information processing system 1 performs learning on the operation states of the plant on the basis of the acquired state data and generates a determination model (abbreviated to "model" in some cases) used to determine the operation states of the plant. The information processing system 1 performs determination on newly acquired state data on the basis of the generated determination model and outputs the determination result to the manufacturing execution system 3, the operation control device 4, the maintenance device 6, and the field operator terminal 7.

Figure 2:
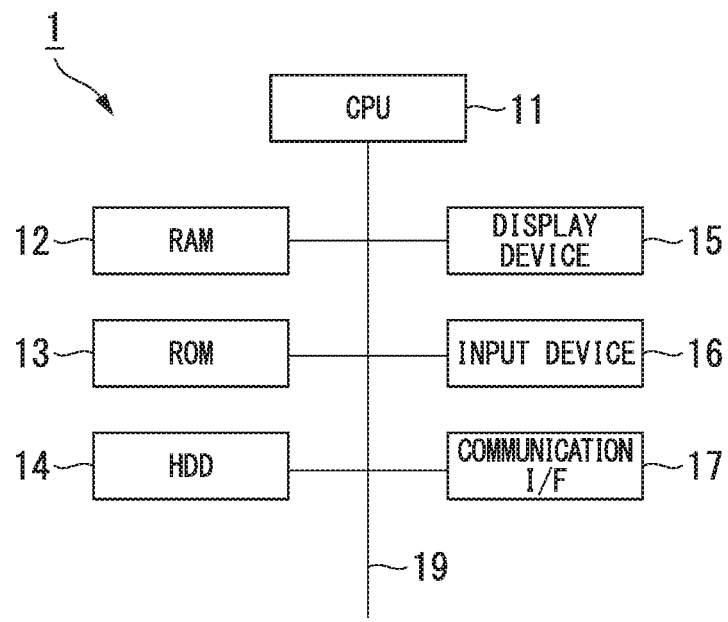
FIG. 2 is a block diagram illustrating an example of a hardware constitution of the information processing system according to the embodiment.

Next, a hardware constitution of the information processing system 1 will be described using FIG. 2. FIG. 2 is a block diagram illustrating an example of the hardware constitution of the information processing system 1 according to the embodiment.

In FIG. 2, the information processing system 1 includes a central processing device (CPU) 11, a random access memory (RAM) 12, a read only memory (ROM) 13, a hard disk drive (HDD) 14, a display device 15, an input device 16, a communication interface (I/F) 17, and a bus 19 configured to connect these.

The information processing system 1 is, for example, a server device, a general-purpose computer such as a desktop type PC, a device such as an FA computer and a PLC, a notebook type or tablet type computer, a PDA, a smartphone, or the like. The information processing system 1 replaces or assists a board operator and may be provided, for example, near a monitoring terminal (not shown) monitored by the board operator.

The CPU 11 executes a program stored in the RAM 12, the ROM 13, or the HDD 14 to perform control of the information processing system 1. The CPU 11 executes an information processing program used to realize the operation of the information processing system 1 which will be described below. The information processing program is acquired from, for example, a recording medium on which the information processing program is recorded, a server from which the information processing program is provided over networks, or the like, is installed in the HDD 14, and is stored in the RAM 12 to be readable from the CPU 11.

The display device 15 is, for example, a liquid crystal display with a display function. The display device 15 may be realized in various forms such as a head mount type display, a glass type display, and a watch type display. The input device 16 is, for example, a keyboard or a mouse with an input function. The input device 16 may be a microphone configured to receive an input of sound information, a camera configured to receive an input of image information, or the like. Note that the display device 15 and the input device 16 may be realized using a device with a display function and an input function such as a touch panel.

The communication I/F 17 controls communication with other devices such as the manufacturing execution system 3, the operation control device 4, the maintenance device 6, and the field operator terminal 7 through wired communication or wireless communication. The communication I/F 17 performs communication control for data transmission and reception, a voice call, e-mail transmission and reception, or the like with respect to other connected devices. The communication I/F 17 may be, for example, an I/F configured to perform communication control corresponding to a communication standard dedicated to industrial instruments such as ISA100 serving as a wireless communication standard of the International Society of Automation (ISA: International Society for Measurement and Control), highway addressable remote transducer (HART) (registered trademark), BRAIN (registered trademark), FOUNDATION Fieldbus, and PROFIBUS. Furthermore, the communication I/F 17 may be an I/F configured to perform communication control corresponding to a general-purpose communication standard such as wireless local area network (LAN) communication, wired LAN communication, infrared communication, and short-range wireless communication.

Figure 3:
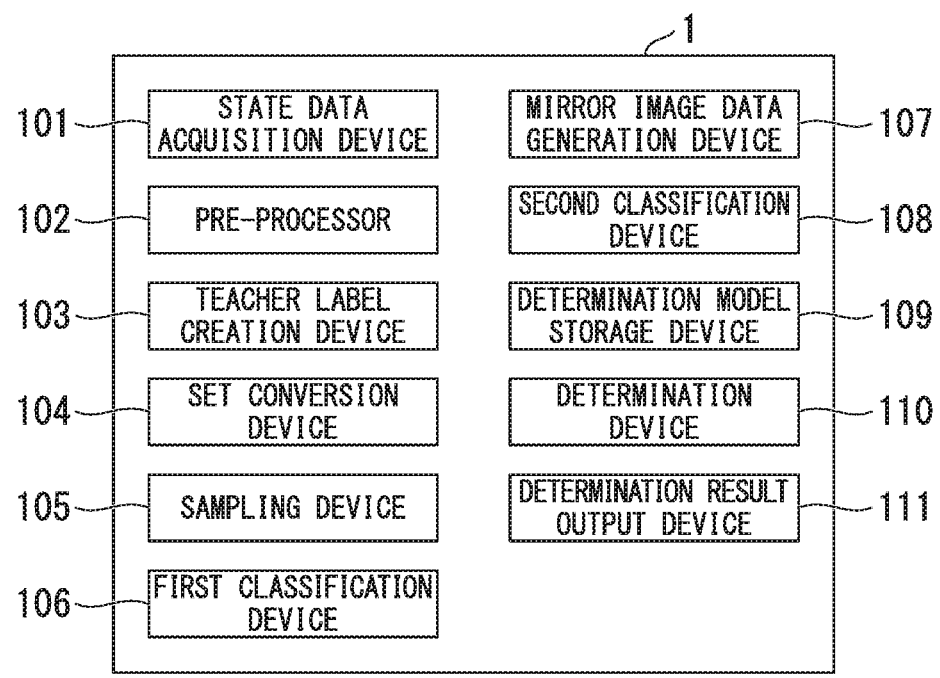
FIG. 3 is a block diagram illustrating an example of a software constitution of the information processing system according to the embodiment.

Next, a software constitution of the information processing system 1 will be described using FIG. 3. FIG. 3 is a block diagram illustrating an example of the software constitution of the information processing system 1 according to the embodiment.

In FIG. 3, the information processing system 1 has functions of a state data acquisition device 101, a preprocessor 102, a teacher label creation device 103, a set conversion device 104, a sampling device 105, a first classification device 106, a mirror image data generation device 107, a second classification device 108, a determination model storage device 109, a determination device 110, and a determination result output device 111. The above-described functions of the information processing system 1 are functional modules realized by the information processing program configured to control the information processing system 1. The information processing program may be provided from a server configured to supply a program or may be provided from a recording medium.

The state data acquisition device 101 acquires state data indicating operation states of the plant device P0. In the embodiment, examples of the state data include measurement data measured by the sensor S1 or the sensor S2. The state data acquisition device 101 acquires state data via the operation control device 4 or the like.

The pre-processor 102 performs pre-processing on the state data acquired by the state data acquisition device 101. The pre-processing is a process of selecting and adjusting teacher data learned in machine learning to improve the accuracy of a determination model of the machine learning generated in a process which will be described below. In the embodiment, the pre-processor 102 is set to perform an outlier exclusion process and a normalization process as the pre-processing. The outlier exclusion process is a process of excluding an outlier which is not suitable for learning from the acquired state data. Whether the state data is an outlier can be determined, for example, using a standard deviation and a predetermined test method when the state data is set to a sample. The pre-processor 102 may exclude, for example, state data when it is expected that abnormal state data has been acquired at a time of starting up a plant, at a time of shutting down a plant, at a time of downtime, or the like, as an outlier. The normalization process is a process of analyzing the acquired state data and adjusting (normalizing) an amplitude of the state data. The normalization is performed, for example, by matching the amplitude of the state data to a maximum value of the acquired amplitude. Note that whether the pre-processing of the state data is executed and a method of the pre-processing are arbitrary.

The teacher label creation device 103 creates a label to be assigned to state data. In machine learning using teacher data, the teacher label creation device 103 assigns a label to state data and makes an object learn the labelled state data. The teacher label creation device 103 can create, for example, two types of label used to classify as a "normal state" and an "abnormal state." Furthermore, the teacher label creation device 103 may create N kinds of label of "Classification 1" to "Classification N." The teacher label creation device 103 may assign a label to a part of the acquired state data (semi-supervised learning). Note that, when unlabelled learning or reinforcement learning is performed, a label may be created by the teacher label creation device 103.

The set conversion device 104 converts acquired state data into a set every hour. State data acquired in a plant strongly depends on a time at which state data has been acquired in many cases. For example, in a plant which operates from 8 hours to 17 hours, an operation of the plant may start at 8 hours on weekdays, stop at 12 hours for a lunch break, resume at 13 hours, and finish at 17 hours. Therefore, for example, an operation state of the plant at 8:00 to 8:10 on weekdays is similar to an operation state of the plant at the same time the next day, but on the same day, the operation state thereof at 8:00 to 8:10 is different from an operation state thereof at 16:50 to 17:00 in many cases. In other words, an operation state of the plant is repeated over a predetermined cycle in many cases, and state data to be acquired is also affected by the operation state over a predetermined cycle. If state data with an obvious trend, which is affected by such an operation state, is included in teacher data at a time of producing a determination model, the accuracy of the determination model decreases. On the other hand, it is difficult to manually eliminate such an obvious trend in many cases.

In the embodiment, acquired state data is converted into a set every hour in consideration of characteristics, in an obvious trend, of the operation state of a plant which repeatedly varies over a predetermined cycle. For example, the set conversion device 104 may convert state data which is sequentially acquired in time series into a set obtained by superimposing the state data at regular intervals such as 24 hours. It becomes possible to clarify an influence on the state data according to the time within a cycle by superimposing the state data at regular intervals. Such an obvious trend can be eliminated using the sampling device 105, the first classification device 106, the mirror image data generation device 107, and the second classification device 108 which will be described below by clarifying an influence on the state data according to the time within the cycle.

The sampling device 105 randomly samples teacher data from the acquired state data. A set (sub-set) which is not easily affected by the state data according to the time within the cycle can be created by performing random sampling. Note that execution of the random sampling is arbitrary. For example, when a trend in state data which is desired to be detected by the determination model is completely obscured by an obvious trend, random sampling may be skipped.

The first classification device 106 generates a determination line used to classify state data. The determination line is a boundary line used to cluster state data. For example, a non-linear classifying device such as a support vector machine (SVM) can be used for the first classification device 106. The SVM can generate a determination line used to cluster state data using the state data as input data. The state data used to generate the determination line in the first classification device 106 is state data acquired in the state data acquisition device 101 or state data to which mirror image data is added in the mirror image data generation device 107 which will be described below. The state data used to generate the determination line may be data obtained by performing a predetermined arithmetic process on the state data. Note that clustering in an SVM generally increases the accuracy of classification by applying strong conditions. However, the first classification device 106 according to the embodiment decreases the accuracy of classification used to determine a trend in state data by applying weak conditions, but a rough obvious trend included in a set of state data can be extracted. The mirror image data generation device 107 generates mirror image data obtained by mirroring the acquired state data using the determination line generated in the first classification device 106. In the mirror image data and the original state data, an obvious trend is mapped using the determination line as a symmetrical line. The mirror image data generation device 107 can cancel out an obvious trend by adding the generated mirror image data and the original state data. The mirror image data generation device 107 outputs the added mirror image data and state data to the second classification device 108. Note that the mirror image data generation device 107 may repeat generation of mirror image data a plurality of times in accordance with a result of evaluating test data by the second classification device 108. The repetition of the generation of the mirror image data will be described below using a flowchart and the like.

The second classification device 108 generates a determination model on the basis of the state data and the generated mirror image data. The second classification device 108 generates a determination model used to cluster trends in state data to be determined from state data in which an obvious trend has been cancelled out using a non-linear classifying device such as an SVM having added state data and the generated mirror image data as input data. The second classification device 108 may use a multi-class SVM (MMSVM) method for preparing "nC2" SVMs with respect to n classes to be classified when the classes are n classes (multi-classes).

The second classification device 108 generates a determination model for performing classification according to strong conditions for the purpose of general clustering unlike the first classification device 106. A trend in state data can be determined in accordance with this determination model for the purpose of performing classification according to strong conditions.

The second classification device 108 evaluates the generated determination model using test data which is prepared in advance. The test data is data in which a classification result (a correct answer) of a trend in state data is already known. The second classification device 108 evaluates whether the evaluation (an expected value) of the test data using the generated determination model is a predetermined value or more. When the expected value is the predetermined value or more, the second classification device 108 stores the generated determination model in the determination model storage device 109. On the other hand, when the expected value is less than the predetermined value, the second classification device 108 inputs the state data and the generated mirror image data to the mirror image data generation device 107, generates mirror image data again, and regenerates a determination model. The above-described process is repeated until the expected value is the predetermined value or more so that the second classification device 108 can generate a determination model capable of determining the trend in the state data. The second classification device 108 stores optimum determination models which are generated repeatedly in the determination model storage device 109.

In an execution phase, the determination device 110 performs determination for state data using a determination model generated by the second classification device 108 and generates a determination result. The determination result is, for example, a diagnosis result obtained by diagnosing deterioration or failure of the sensor S1 and the like described with reference to FIG. 1. The determination device 110 outputs the generated determination result to the determination result output device 111.

The determination result output device 111 outputs the determination result acquired from the determination device 110 to the manufacturing execution system 3, the operation control device 4, the maintenance device 6, and the field operator terminal 7 which are described with reference to FIG. 1.

Note that the machine learning method used in the first classification device 106 or the second classification device 108 is not limited to an SVM and may be, for example, a method using a neural network method such Deep Learning.

Note that a case in which functions of the state data acquisition device 101, the pre-processor 102, the teacher label creation device 103, the set conversion device 104, the sampling device 105, the first classification device 106, the mirror image data generation device 107, the second classification device 108, the determination model storage device 109, the determination device 110, and the determination result output device 111, which are included in the information processing system 1 in FIG. 3, are realized by software has been described. However, at least one of the above-described functions may be realized by hardware. Furthermore, each of the above-described functions may be implemented by dividing one function into a plurality of functions. Each of the above-described functions may be implemented by integrating two or more functions into one function.

Next, set conversion of state data in the information processing system 1 will be described using FIGS. 4A and 4B. FIGS. 4A and 4B are diagrams illustrating an example of set conversion of state data in the information processing system according to the embodiment.

FIG. 4A illustrates state data before set conversion which is acquired in time series in the state data acquisition device 101. In FIG. 4A, a horizontal axis indicates time and a vertical axis indicates an acquired value of state data. FIG. 4A illustrates values of state data acquired during four days which are arranged in time series. FIG. 4A shows the fact that the values of the state data have a periodicity in which the values thereof rise rapidly around 8 hours every day and fall rapidly around 17 hours every day. Therefore, when the values of the state data are directly subject to machine learning using the values thereof as teacher data, the generated model is greatly affected by time and thus highly likely to have poor determination the accuracy. On the other hand, since an influence of state data according to time is complicated, it is difficult to artificially modify a value of the state data.

FIG. 4B is a diagram showing a state in which a set of state data which is acquired in time series in FIG. 4A is superimposed and normalized every 24 hour period from 0 hours to 24 hours every day in the set conversion device 104. An obvious trend can be excluded by superimposing and normalizing the state data for each period.

Figure 5A:
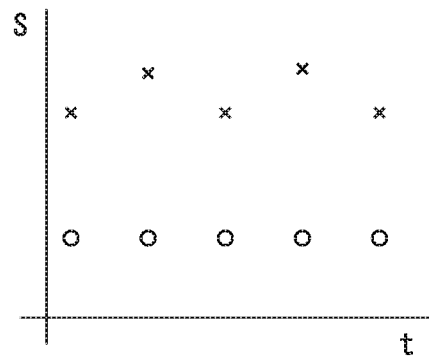
FIGS. 5A to 5D are diagrams illustrating an example of determination model generation in the information processing system according to the embodiment.

Next, determination model generation in the information processing system 1 will be described using FIGS. 5A to 5D. FIGS. 5A to 5D are diagrams illustrating an example of the determination model generation in the information processing system according to the embodiment. In FIGS. 5A to 5D, horizontal axes indicate time and vertical axes indicate values of state data. Note that parameters of the horizontal axes and the vertical axes of the state data are arbitrary (the same applies to FIGS. 6A to 6D). FIG. 5A illustrates acquired state data. Circles in FIG. 5A indicate state data which is acquired from a normal sensor S1. Crosses in FIG. 5A indicate state data which is acquired from a deteriorated sensor S1. The state data which is acquired from the deteriorated sensor S1 is shifted by a predetermined value compared to the state data which is acquired from the normal sensor S1.

Figure 5B:
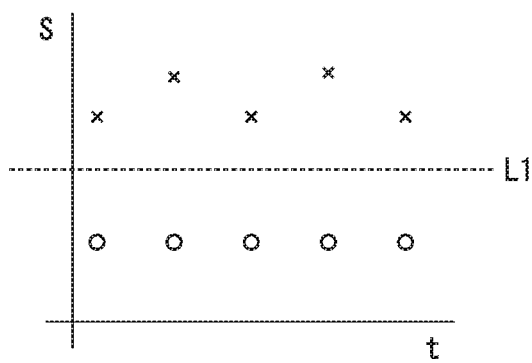

FIG. 5B illustrates a determination line L1 generated in the first classification device 106 with respect to the acquired state data of FIG. 5A. Note that FIG. 5B illustrates a case in which the determination line L1 is parallel to a horizontal axis, but the determination line is not limited to a case in which the determination line is parallel to the horizontal axis.

Figure 5C:
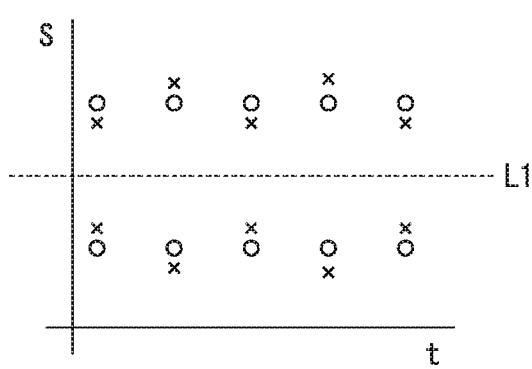

FIG. 5C is a diagram obtained by adding symmetrical mirror image data with respect to the determination line L1 to the acquired state data. In other words, the mirror image data is arranged symmetrically with respect to the determination line L1.

Figure 5D:
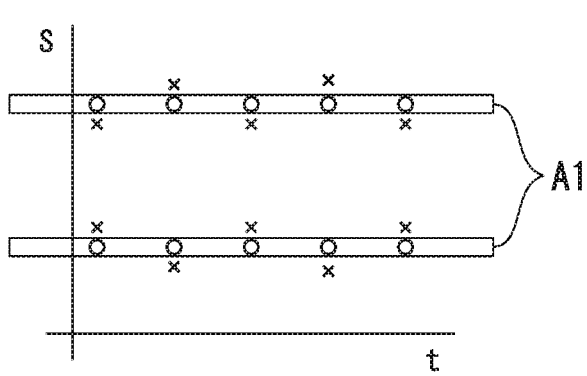

FIG. 5D illustrates a case in which a rectangular region obtained when the second classification device 108 generates and illustrates a determination model with respect to the state data and the mirror image data of FIG. 5C is set to a determination region A1. Mirror image data obtained by mirroring the original state data using the determination line L1 is added and then the determination region A1 is generated so that a shift of the state data due to deterioration of the sensor can be cancelled. The determination region A1 shows that determination regions can be set according to the deteriorated state data indicated by crosses under strong conditions in contrast to the regions classified by the determination line L1 of FIG. 5B.

Next, another example of determination model generation in the information processing system 1 will be described using FIGS. 6A to 6D. FIGS. 6A to 6D are diagrams illustrating another example of the determination model generation in the information processing system 1 according to the embodiment. In FIGS. 6A to 6D, horizontal axes indicates time and vertical axes indicate values of state data.

Figure 6A:
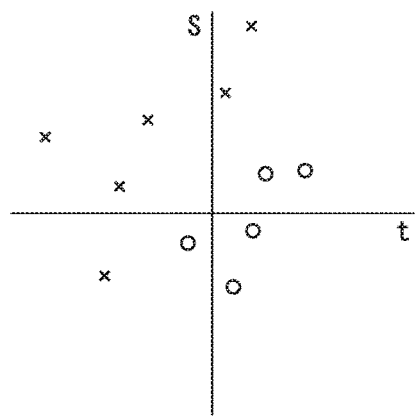
FIGS. 6A to 6D are diagrams illustrating another example of the determination model generation in the information processing system according to the embodiment.

FIG. 6A illustrates acquired state data. In FIGS. 6A to 6D, circles in FIG. 6A indicate state data which is acquired from a normal sensor S1 like FIGS. 5A to 5D. Furthermore, crosses in FIG. 6A indicate state data which is acquired from a deteriorated sensor S1. The state data which is acquired from the deteriorated sensor S1 is shifted to an upper left direction in the drawing compared to the state data which is acquired from the normal sensor S1.

Figure 6B:
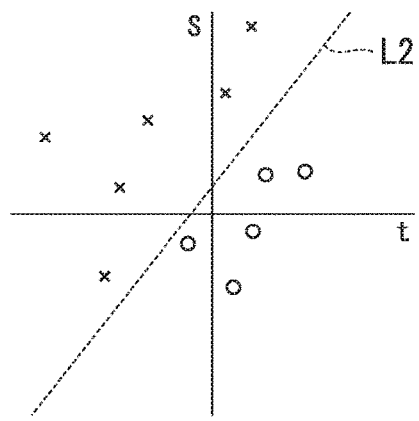

FIG. 6B illustrates a determination line L2 generated in the first classification device 106 with respect to acquired state data of FIG. 6A. The determination line L2 is a straight line with a predetermined inclination configured to divide a region illustrated in FIG. 6B into upper left and lower right regions.

Figure 6C:
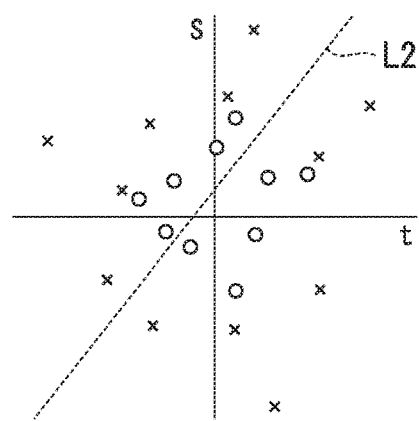
Figure 6D:
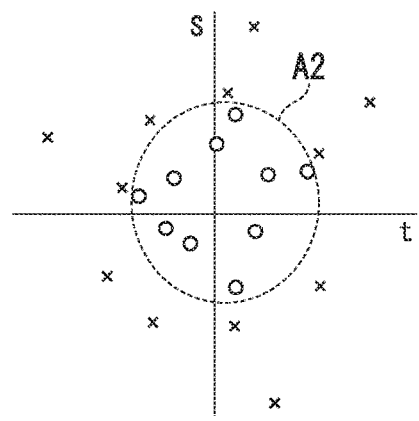

FIG. 6C is a diagram obtained by adding symmetrical mirror image data with respect to the determination line L2 to the acquired state data. In other words, the mirror image data is arranged symmetrically with respect to the determination line L2. FIG. 6D illustrates a case in which a circular region obtained when the second classification device 108 generates and illustrates a determination model with respect to the state data and the mirror image data of FIG. 5C is set to a determination region A2. Mirror image data obtained by mirroring the original state data using the determination line L2 is added and then the determination region A2 is generated so that a shift of the state data due to deterioration of the sensor can be cancelled. The determination region A2 shows that determination regions can be set according to the deteriorated state data indicated by crosses under strong conditions in contrast to the regions classified by the determination line L2 of FIG. 6B. Furthermore, in the embodiment, it is shown that the determination region may have a rectangular shape, a circular shape, and the like.

Figure 7:
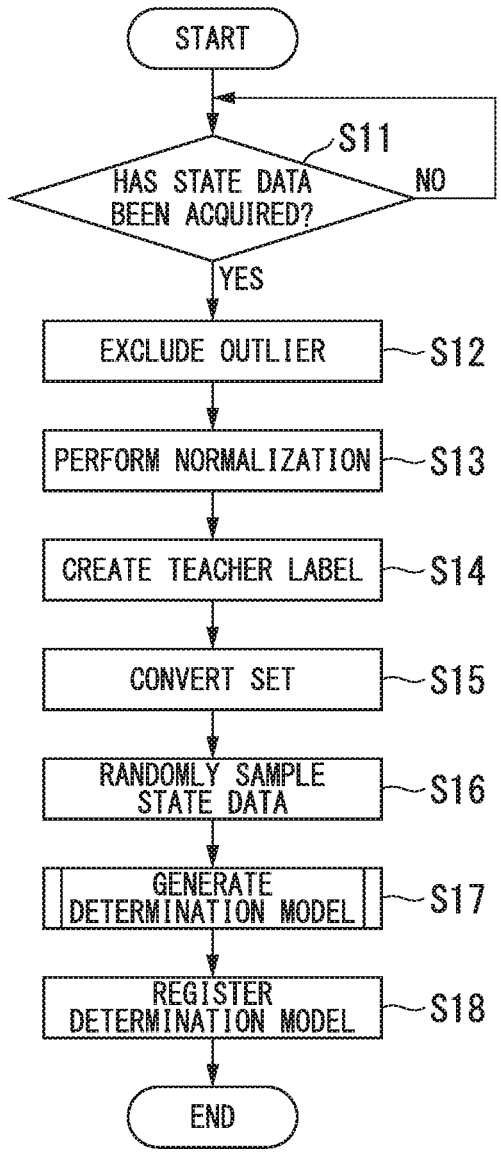
FIG. 7 is a flowchart for describing an example of an operation of a learning phase in the information processing system according to the embodiment.

Next, an operation of a learning phase in the information processing system 1 will be described using FIG. 7. FIG. 7 is a flowchart for describing an example of an operation of the learning phase in the information processing system according to the embodiment. The learning phase is a process from generation to registration of a determination model on the basis of state data. The operation of the flowchart illustrated in FIG. 7 has been described with reference to FIG. 3. The operation is set to be performed in each function of the information processing system 1. Therefore, a description will be provided on the assumption that an operation subject of the following process is the information processing system 1.

In FIG. 7, the information processing system 1 determines whether state data has been acquired (Step S11). The determination concerning whether state data has been acquired can be performed, for example, based on whether the state data acquisition device 101 has acquired state data from the sensor S1. When is determined that state data has not been acquired (Step S11: NO), the information processing system 1 repeats a process of Step S11 and waits for acquisition of state data.

On the other hand, when it is determined that state data has been acquired (Step S11: YES), the information processing system 1 excludes outliers (Step S12). The outliers can be excluded in the pre-processor 102. After the process of Step S12 is performed, the information processing system 1 performs a normalization process (Step S13). The normalization process can also be performed in the pre-processor 102.

After the process of Step S13 is performed, the information processing system 1 performs a teacher label creation process (Step S14). The teacher label creation process can be performed when the teacher label creation device 103 assigns the created label to the state data serving as teacher data. The teacher data is the normalized state data in Step S13.

After the process of Step S14 is performed, the information processing system 1 converts state data acquired in time series into a set for each of times (Step S15). The conversion of the state data acquired in time series into a set for each of times can be performed by superimposing the state data at regular intervals with the set conversion device 104 as described in FIG. 4.

After the process of Step S15 is performed, the information processing system 1 randomly samples state data from the converted set in the process of Step S14 (Step S16). The random sampling can be performed when the sampling device 105 randomly samples state data serving as teacher data from the acquired state data. A sub-set which is not easily affected by time within a period can be created using random sampling.

After the process of Step S16 is performed, the information processing system 1 performs a determination model generation process (Step S17). A determination model is a process of generating a model used to determine state data in an execution phase. The determination model is a model used to determine whether state data is within a determination region. The determination region may be, for example, the determination region A1 illustrated in FIG. 5 or the determination region A2 illustrated in FIG. 6. A determination model generation process can be performed by the first classification device 106, the mirror image data generation device 107, and the second classification device 108. Details of the determination model generation process will be described using FIGS. 9 and 10.

After the process of Step S17 is performed, the information processing system 1 registers the generated determination model (Step S18). The registration of the determination model can be performed by storing the determination model generated by the second classification device 108 in the determination model storage device 109. After the process of Step S18 is performed, the information processing system 1 ends the operation of the learning phase in the flowchart illustrated in FIG. 7.

Figure 8:
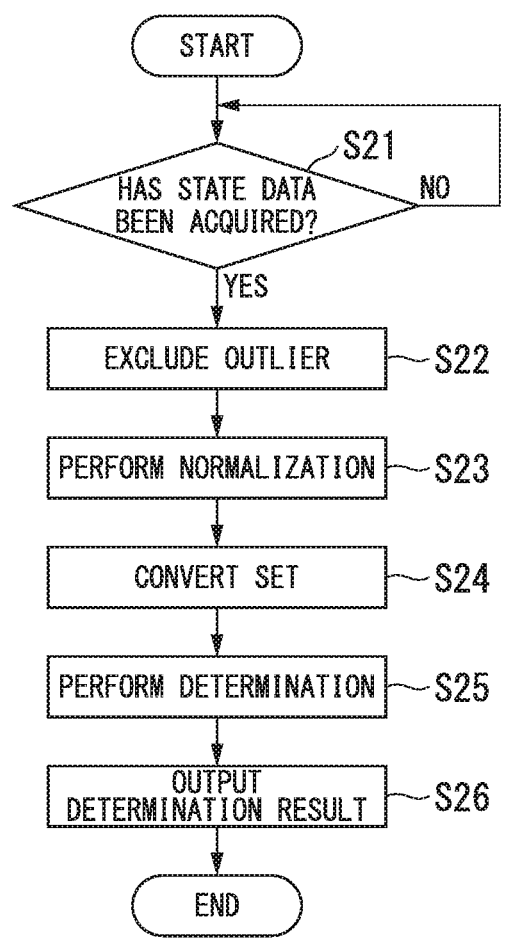
FIG. 8 is a flowchart for describing an example of an operation of an execution phase in the information processing system according to the embodiment.

Next, an operation of an execution phase in the information processing system 1 will be described using FIG. 8. FIG. 8 is a flowchart for describing an example of the operation of the execution phase in the information processing system 1 according to the embodiment. The execution phase is a process of performing determination for the acquired state data on the basis of the determination model generated in the learning phase described with reference to FIG. 7. The operation of the flowchart illustrated in FIG. 8 has also been described with reference to FIG. 3. The operation is set to be performed in each function of the information processing system 1. Therefore, a description will be provided on the assumption that an operation subject of the following process is the information processing system 1.

In FIG. 8, the information processing system 1 determines whether state data has been acquired (Step S21). The determination concerning whether state data has been acquired can be performed in the same manner as in the process of Step S11 of FIG. 7. When it is determined that state data has not been acquired (Step S21: NO), the information processing system 1 repeats a process of Step S21 and waits for acquisition of state data.

On the other hand, when it is determined that state data has been acquired (Step S21: YES), the information processing system 1 excludes outliers (Step S22). The outliers can be excluded in the pre-processor 102. After the process of Step S22 is performed, the information processing system 1 performs a normalization process (Step S23). The normalization process can also be performed in the pre-processor 102.

After the process of Step S23 is performed, the information processing system 1 converts state data acquired in time series into a set for each of times in the same manner as in the process of Step S15 of FIG. 7 (Step S24).

After the process of Step S24 is performed, the information processing system 1 performs a determination process (Step S25). The determination process is determination concerning whether the state data acquired in Step S21 is included in a determination region when the state data is applied to a determination model created in the learning phase. The determination process performs determination concerning a region in which the state data is included when there are a plurality of determination regions.

After the process of Step S25 is performed, the information processing system 1 outputs a determination result (Step S26). The determination result output device 111 outputs an output of the determination result to the operation control device 4 or the like. The determination result output to the operation control device 4 or the like is used as, for example, information used to control an operation of the reactor P1. The determination result output device 111 may output the determination result using information display or characters on the display device 15 of FIG. 2, an alert using sound, or the like.

Note that a plurality of determination models may be used in the process of Step S25. For example, when state data is clustered into a plurality of classifications, a determination model applied for each classification may be changed.

Figure 9:
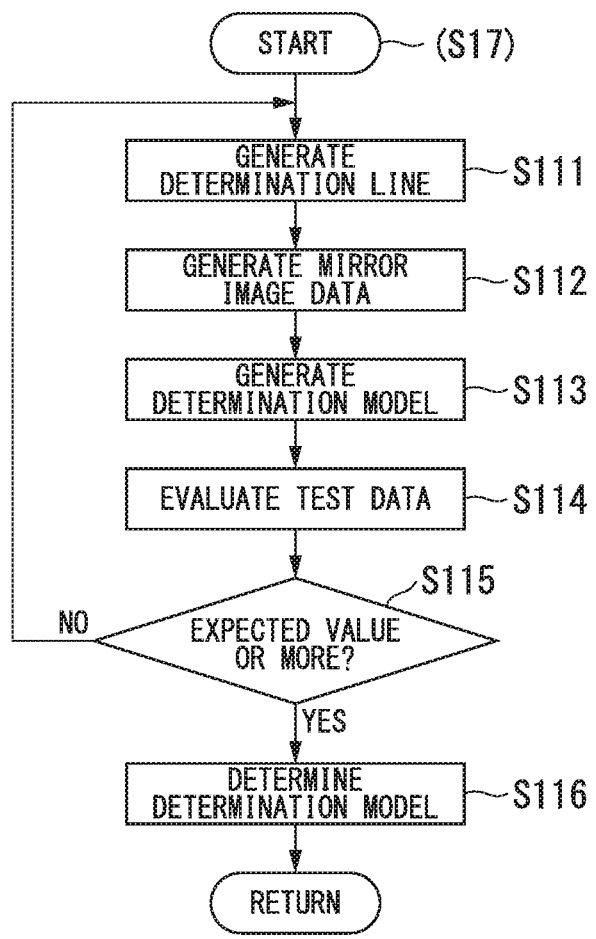
FIG. 9 is a flowchart for describing an example of an operation of a determination model generation process of a learning phase in the information processing system according to the embodiment.

Next, details of the determination model generation process of Step S17 in FIG. 7 will be described using FIG. 9. FIG. 9 is a flowchart for describing an example of an operation of the determination model generation process of the learning phase in the information processing system according to the embodiment.

In the determination model generation process of Step S17 illustrated in FIG. 9, the information processing system 1 generates a determination line (Step S111). The generation of the determination line is a process performed in the first classification device 106 of FIG. 3. The determination line generated may be, for example, a determination line when state data, to which normal data and deteriorated data labels are assigned, is input as teacher data as described with reference to FIG. 5B or 6B.

After the process of Step S111 is performed, the information processing system 1 generates mirror image data (Step S112). The generation of the mirror image data is a process performed by the mirror image data generation device 107 as described with reference to FIG. 5C or 6C and may include generation of mirror image data of state data which is symmetrical with respect to the determination line L1 or the determination line L2. The mirror image data is added to the original state data.

After the process of Step S112 is performed, the information processing system 1 generates a determination model (Step S113). The generation of the determination model can be performed by the second classification device 108.

After the process of Step S113 is performed, the information processing system 1 evaluates the accuracy of the generated determination model using test data (Step S114). A correctly classified label is assigned to the test data in advance, and the accuracy of the determination model is evaluated using a size of a correct answer rate of classification when determination is performed on the test data using the determination model. A preset threshold value (expected value) can be provided for the correct answer rate. The information processing system 1 determines whether the correct answer rate of the test data is a preset expected value or more (Step S115). When it is determined that the correct answer rate is less than the preset expected value (Step S115: NO), the information processing system 1 performs the process of Step S11 again and repeatedly performs the processes of Step S111 to Step S114 until the correct answer rate is the expected value or more. Note that the number of repetitions may be limited to a predetermined number of times. The information processing system 1 may select a determination model having a predetermined number of repetitions with the highest correct answer rate among predetermined numbers of repetitions.

On the other hand, when it is determined that the correct answer rate is the preset expected value or more (Step S115: YES), the information processing system 1 determines that the determination model is available in the execution phase and determines this determination model (Step S116). After the process of Step S116 is performed, the information processing system 1 ends the process of Step S17 illustrated in FIG. 9.

Figure 10:
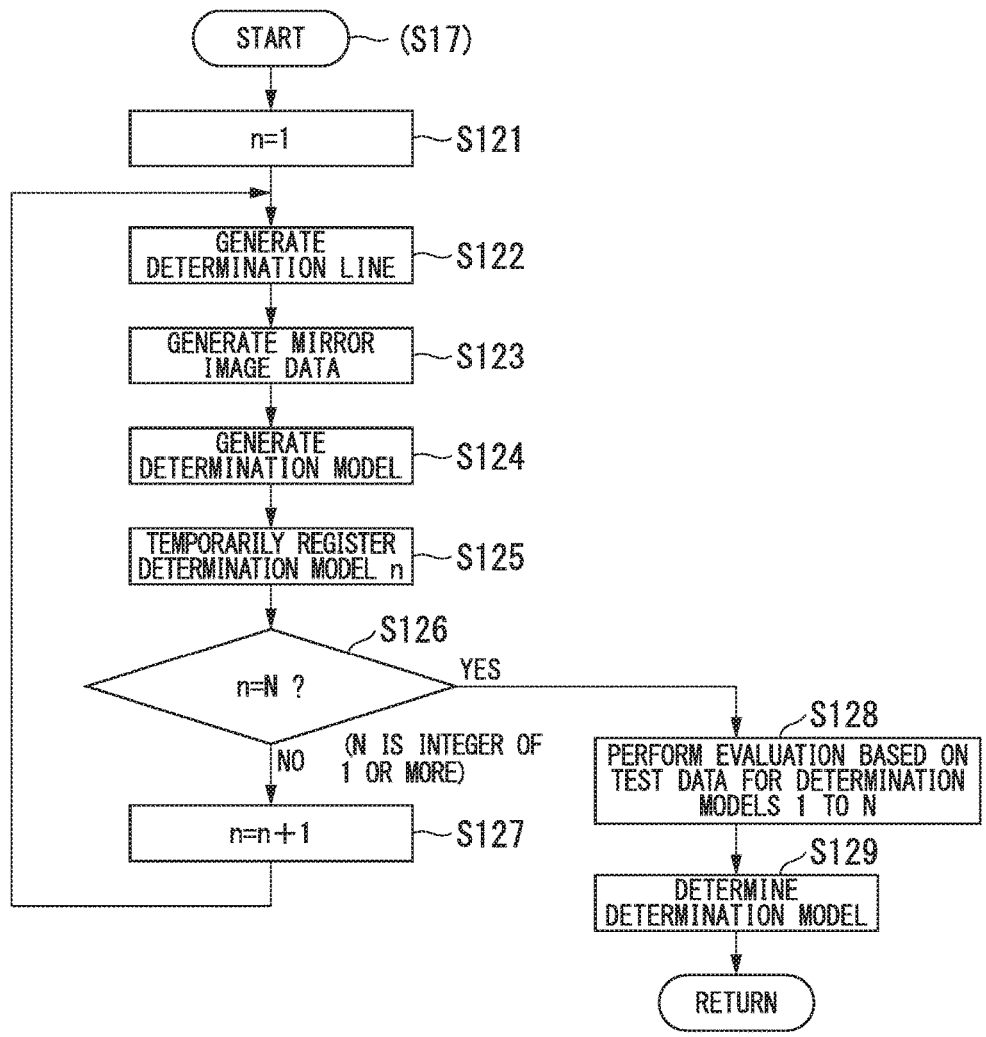
FIG. 10 is a flowchart for describing another example of the operation of the determination model generation process of the learning phase in the information processing system according to the embodiment.

Next, the determination model generation process in Step S17 of FIG. 7 will be described using FIG. 10. The process of Step S17 described with reference to FIG. 10 is another embodiment which is different from the process described with reference to FIG. 9. FIG. 10 is a flowchart for describing another example of the operation of the determination model generation process of the learning phase in the information processing system according to this embodiment.

In the determination model generation process of Step S17 illustrated in FIG. 10, the information processing system 1 substitutes 1 for the algebraic n (Step S121). The algebraic n is the number of repetitions of the processes of Step S122 to Step S125 which will be described below.

After the process of Step S121 is performed, the information processing system 1 generates a determination line (Step S122). A process of Step S122 is the same as the process of Step S111 described with reference to FIG. 9. Furthermore, since a determination model generation process of Step S123 and a determination model generation process of Step S124 which are performed after the process of Step S122 is performed are the same as the process of Step S112 and the process of Step S113 of FIG. 9, a description thereof will be omitted.

After the process of Step S124 is performed, the information processing system 1 temporarily registers a determination model n generated in the process of Step S124 (Step S125). The determination model n is a determination model generated at the number of repetitions n of the processes of Step S122 to Step S125. Since the number of repetitions is N times which will be described below, N determination models from a determination model 1 to a determination model N are temporarily registered. Furthermore, the temporary registration is a provisional registration until the process of the flowchart illustrated in FIG. 10 ends.

After the process of Step S125 is performed, the information processing system 1 determines whether n=N is satisfied (Step S126). N is the predetermined upper limit number of repetitions of the processes of Step S122 to Step S125 and N is an integer of 1 or more. For example, when N is 2 (N=2), the processes of Step S122 to Step S125 are performed twice. When it is determined that n is not equal to N (n≠N) (Step S126: NO), the information processing system 1 adds 1 to n (Step S127) and performs the process of Step S122 again.

On the other hand, when it is determined that n is equal to N (n=N) (Step S126: YES), the information processing system 1 performs an evaluation based on test data for each of the determination models 1 to N which are temporarily registered in the process of Step S125 (Step S128). The evaluation of the determination model includes an evaluation of a correct answer rate of test data in the same manner as in the process of Step S114 of FIG. 9.

After the process of Step S128 is performed, the information processing system 1 determines a determination model evaluated as having the highest evaluation (correct answer rate) in the process of Step S128 as a determination model used in the execution phase (Step S129). After the process of Step S129 is performed, the information processing system 1 ends the process of Step S17 illustrated in FIG. 10.

As described above, methods of generating a determination model of the determination model generation process described with reference to FIG. 9 and the determination model generation process described with reference to FIG. 10 differ in that, while the determination model generation process described with reference to FIG. 9 generates the mirror image data based on the determination line to generate the determination model until the generated determination model has the predetermined expected value or more, the determination model generation process described with reference to FIG. 10 selects a determination model having the highest evaluation in the generation of the mirror image data and the generation of the determination model based on the determination line in which the repetition is performed a predetermined number of times.

As described with reference to FIG. 9 or 10, in the embodiment, in an information processing system, in which a determination line used to classify state data is generated, mirror image data obtained by mirroring the state data using the generated determination line is generated, and a determination model is generated on the basis of the state data and the generated mirror image data so that a determination model configured to determine operating conditions of a plant using machine learning is generated, the versatility thereof can be improved. For example, even when obvious trends of the sensor S1 and the sensor S2 differ, the information processing system 1 can automatically generate determination models without manually performing modification or the like of teacher data. In other words, information processing with high versatility using machine learning can be performed for a plant outputting state data with different obvious trends.

Figure 11A:
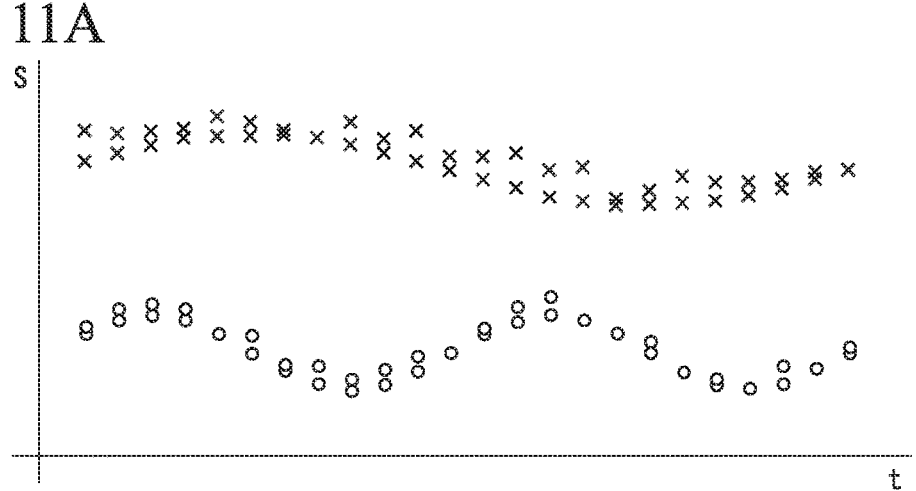
FIGS. 11A to 11C are diagrams illustrating an example of repetition of a mirror image data generation process of the learning phase in the information processing system according to the embodiment.
Figure 11B:
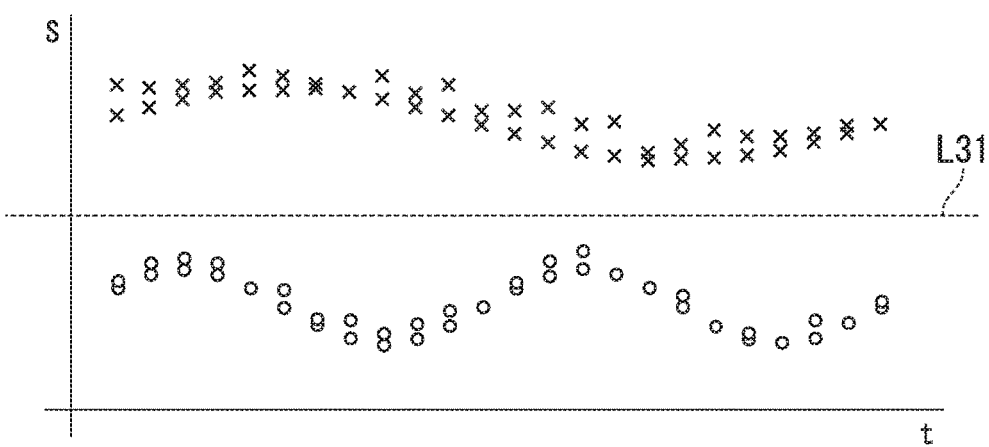
Figure 11C:
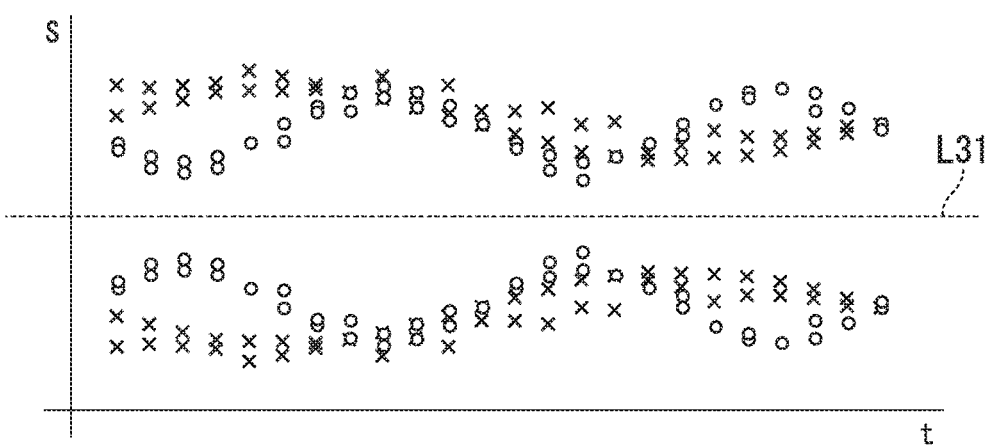
Figure 12A:
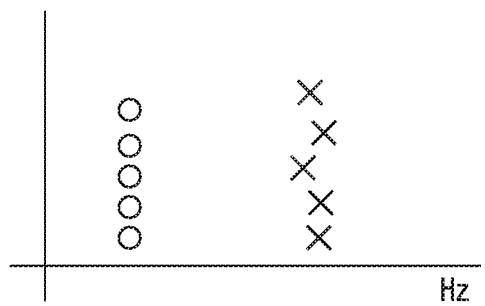
FIGS. 12A to 12C are diagrams illustrating an example of repetition of the mirror image data generation process of the learning phase in the information processing system according to the embodiment.
Figure 12B:
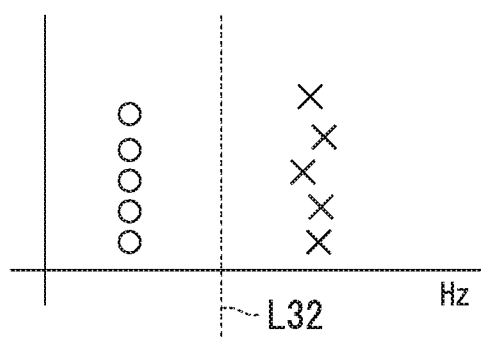
Figure 12C:
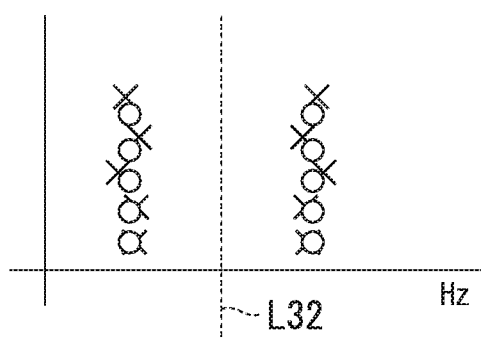
Figure 13:
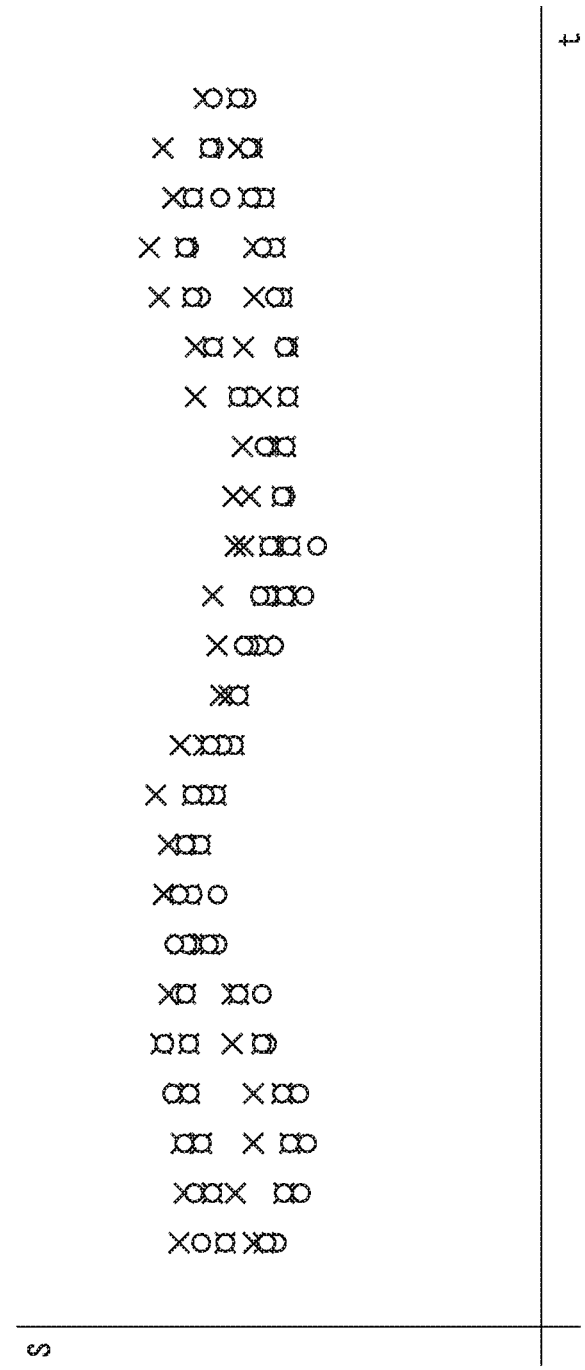
FIG. 13 is a diagram illustrating an example of repetition of the mirror image data generation process of the learning phase in the information processing system according to the embodiment.

Next, repetition of generation of mirror image data described with reference to FIGS. 9 and 10 will be described using FIGS. 11 to 13. FIGS. 11A to 11C, FIGS. 12A to 12C, and FIG. 13 are diagrams illustrating examples of repetition of the mirror image data generation process of the learning phase in the information processing system according to the embodiment. FIG. 11A to FIG. 13 illustrate a case in which the number of repetitions is two.

Horizontal axes of FIGS. 11A to 11C are time and vertical axes thereof are values of state data.

FIG. 11A illustrates a set of acquired state data. Circles on a lower side of the drawing indicate state data (hereinafter abbreviated as "normal data") of the normal sensor S1 and crosses on an upper side of the drawing indicate state data (hereinafter abbreviated as "deteriorated data") of the deteriorated sensor S1. FIG. 11A illustrates a set obtained by superimposing the acquired state data over a predetermined cycle in the set conversion device 104.

FIG. 11B illustrates a determination line L31 generated on the basis of the state data of FIG. 11A. In the case of the determination line L31, the determination line is generated at a midway point between the normal data and the deteriorated data. In other words, the determination line L31 can be used to classify the normal data and the deteriorated data, but cannot be used to determine a change in state data present in the normal data. Furthermore, the determination line L31 cannot be used to determine a change in state data present in the deteriorated data either.

FIG. 11C illustrates a set obtained by adding a mirror image generated on the basis of the generated determination line L31 to the original state data. As illustrated in FIG. 11C, even when the mirror image data and the state data are superimposed at one time, it is difficult to illustrate the characteristics of the normal data and the deteriorated data in regions. In addition, even when the determination model is generated on the basis of the state data of FIG. 11C, a determination model having a low correct answer rate and low accuracy with respect to test data is obtained. For example, in the determination model generation process described with reference to FIG. 9, the correct answer rate is not a predetermined expected value or more in the process of Step S115 (Step S115: NO), a determination line is generated in the process of Step S111 again, and mirror image data is generated in the process of Step S112. FIGS. 12A to 12C, which will be described below, illustrate a process of generating a determination line and generating mirror image data in addition to the process described with reference to FIGS. 11A to 11C.

FIG. 12A is a diagram obtained by converting a set obtained by adding the mirror image data illustrated in FIG. 11C into a set obtained by converting a horizontal axis to a frequency. Since the set illustrated in FIG. 11C is a set having the same determination data with respect to the determination line L31, a case in which only one side (an upper side) of the determination line L31 is used will be described in the following description. In order to convert a horizontal axis of data in which a horizontal axis is time into a frequency, for example, a fast Fourier transform (FFT) is performed. In a sensor or the like, there are a case in which a measured value is shifted and increases or decreases along with deterioration of the sensor and a case in which a frequency of the measured value is shifted along with deterioration of the sensor. For example, in a sensor in which both a measured value shift and a frequency shift occur along with deterioration of the sensor, the frequency shift cannot be cancelled simply by cancelling the measured value shift, and thus the correct answer rate from the test data decreases. In the state data based on the sensor having such an obvious trend, addition of mirror image data used to cancel out the measured value shift and addition of mirror image data used to cancel out the frequency shift are used together so that a determination model having high accuracy can be generated.

FIG. 12B illustrates a determination line L32 generated for the set illustrated in FIG. 12A. The determination line L32 is a determination line used to classify the normal data and the deteriorated data with respect to the frequency.

FIG. 12C illustrates mirror image data added to state data using the determination line L32 generated in FIG. 12B. The frequency shift due to deterioration of the sensor can be cancelled by adding mirror image data using the determination line based on the frequency.

FIG. 13 is a diagram illustrating a set obtained by converting the frequency axis of FIG. 12C into a time axis again. As described above, since FIG. 12C is a diagram obtained by frequency-converting only the upper side of the determination line L31 in FIG. 11C and adding mirror image data to the upper side thereof, the set of FIG. 13 also corresponds to the upper side of FIG. 11C. FIG. 13 illustrates the set of the state data in which the frequency shift has been cancelled out. A determination model, which is able to determine state data in which a shift of a numerical value has been cancelled out and the frequency shift has been cancelled out, can be generated by performing learning on such data.

In the embodiment, mirror image data is added to state data using a determination line generated in first learning, and the state data, to which the mirror image data is added, is set as input data of second learning. In addition, the mirror image data is added to the state data serving as the input data of the second learning using the determination line generated in the second learning. A plurality of obvious trends included in the state data can be cancelled by repeating addition of such mirror image data. The number of repetitions of the addition of the mirror image data is arbitrary.

Figure 14:
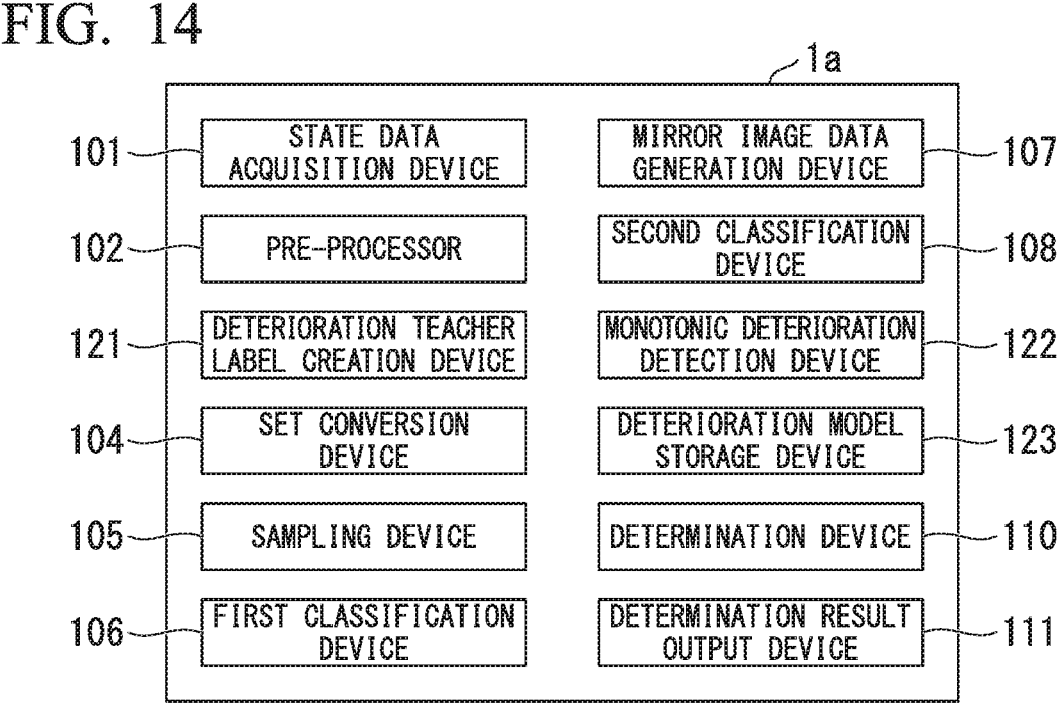
FIG. 14 is a block diagram illustrating an example of a software constitution when the information processing system of the embodiment is applied for a deterioration diagnosis.

Next, application of the information processing system to a deterioration diagnosis will be described using FIG. 14. FIG. 14 is a block diagram illustrating an example of a software constitution when the information processing system of the embodiment is applied for a deterioration diagnosis.

An information processing system 1a shown in FIG. 14 has a function of determining a phenomenon such as irreversible deterioration. It is difficult to quantitatively ascertain an influence of deterioration on state data, and thus it is difficult to artificially adjust the deterioration when the state data is input as teacher data. For example, a qualitative trend in which deterioration of a sensor progresses depending on a frequency of use, the number of days used, and the like is known as an obvious trend. However, since a state of progression of deterioration of a sensor does not remain constant and depends on individual differences in sensors, usage situations of sensors, and the like, it is difficult to quantitatively ascertain an influence of the deterioration. Therefore, even when labeling concerning whether measurement data of the sensor is normal data or deteriorated data is performed when the measurement data thereof is acquired as state data, it is difficult to apply a determination model generated by learning state data of one sensor to another sensor.

The information processing system 1a described with reference to FIG. 14 is obtained as a specialization of the embodiment for the purpose of determining irreversible deterioration in view of such a situation. Here, irreversible deterioration refers to deterioration when a value, which is shifted in accordance with a progress status of deterioration, monotonically increases or monotonically decreases and deterioration in which a value, which has shifted in the middle of deterioration, does not return to the original value or change. In the embodiment, irreversible deterioration refers to monotonic deterioration.

In FIG. 14, the information processing system 1a has functions of a state data acquisition device 101, a pre-processor 102, a deterioration teacher label creation device 121, a set conversion device 104, a sampling device 105, a first classification device 106, a mirror image data generation device 107, a second classification device 108, a monotonic deterioration detection device 122, a deterioration model storage device 123, a determination device 110, and a determination result output device 111. The functions of the information processing system 1a are functional modules realized by an information processing program configured to control the information processing system 1a. The information processing program may be provided from a server configured to provide a program or may be provided from a recording medium.

Note that, since the functions of the state data acquisition device 101, the pre-processor 102, the set conversion device 104, the sampling device 105, the first classification device 106, the mirror image data generation device 107, the second classification device 108, the determination device 110, and the determination result output device 111 in the information processing system 1a are the same as the functions of the information processing system 1 described with reference to FIG. 3, the functions thereof will be denoted with the same reference numerals and a description thereof will be omitted.

The deterioration teacher label creation device 121 is an aspect of the teacher label creation device 103 described with reference to FIG. 3 and creates a label used to assign a progress status of deterioration in accordance with a sensor or the like. The deterioration teacher label creation device 121 creates, for example, five types of label, i.e., "deterioration 1," "deterioration 2," "deterioration 3," "deterioration 4," and a "normal state" in accordance with the sensor. The progress status of the deterioration is assumed to monotonically deteriorate in an order of a "normal state"→"deterioration 4"→"deterioration 3"→"deterioration 2"→"deterioration 1." A type of a label and the number of labels can be changed in accordance with a sensor or the like. For example, although FIG. 1 illustrates a case in which two sensors which are the sensor S1 and the sensor S2 are used in the plant, a common label can be used when the sensor S1 and the sensor S2 are sensors of the same type.

In the learning phase, the monotonic deterioration detection device 122 acquires a determination model created by the second classification device 108 and determines whether the acquired determination model matches the trend of monotonic deterioration. To be specific, the monotonic deterioration detection device 122 detects whether the generated determination model is generated in an order of monotonic deterioration of "normal state"→"deterioration 4"→"deterioration 3"→"deterioration 2"→"deterioration 1." When it is determined that the generated determination model is generated in this order, it can be determined that the generated determination model correctly determines the state data.

When it is determined that the generated determination model is correctly generated, the monotonic deterioration detection device 122 stores the generated determination model in the deterioration model storage device 123. On the other hand, when it is determined that the generated determination model is not correctly generated, the monotonic deterioration detection device 122 discards the generated determination model and notifies the first classification device 106, the mirror image data generation device 107, and the second classification device 108 of this. The first classification device 106, the mirror image data generation device 107, and the second classification device 108 perform repetition of mirror image data addition and regeneration of a determination model on the state data. Note that when the number of repetitions of the mirror image data addition reaches a predetermined number of times, the first classification device 106, the mirror image data generation device 107, and the second classification device 108 may generate a determination model again on the basis of new state data or adjust internal parameters.

Figure 15:
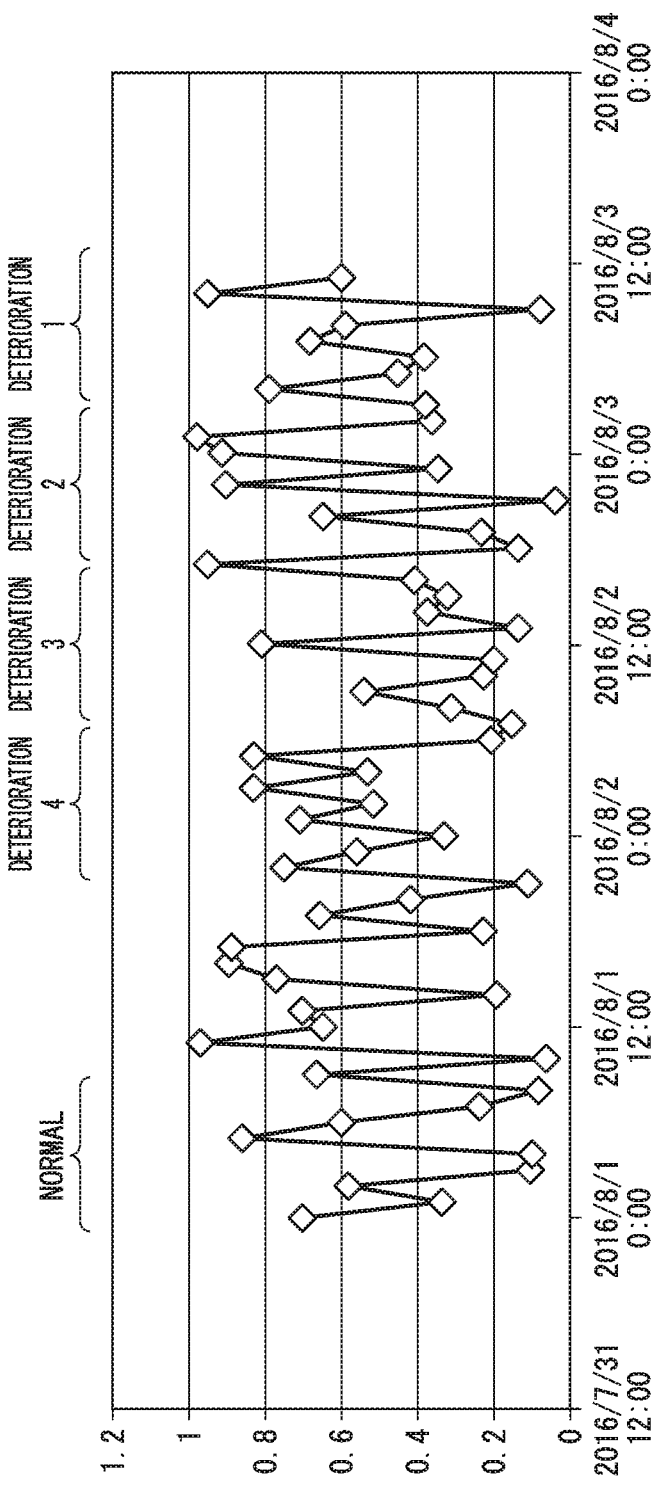
FIG. 15 is a diagram for describing an example of an application to a deterioration diagnosis in the information processing system according to the embodiment.

Nest, an example of generation of a determination model in a learning phase will be described using FIG. 15. FIG. 15 is a diagram for describing an example of an application to a deterioration diagnosis in the information processing system 1*a* according to the embodiment.

In FIG. 15, a horizontal axis indicates time and a vertical axis indicates a value of state data. The information processing system 1*a* generates a normal model serving as a determination model used to determine a "normal state" on the basis of state data acquired at about 0 hours to 8 hours on Aug. 1, 2016. Furthermore, the information processing system 1*a* generates deterioration model 4 used to determine "deterioration 4" on the basis of state data acquired at about 20 hours on Aug. 1, 2016 to 6 hours on Aug. 2, 2016. Similarly, the information processing system 1*a* generates deterioration model 3 used to determine "deterioration 3," deterioration model 2 used to determine "deterioration 2," and deterioration model 1 used to determine "deterioration 1" over time. If the generated deterioration models are not generated in the above-described order in the learning phase, the monotonic deterioration detection device 122 determines that the deterioration model for the monotonic deterioration is not generated correctly and discards the generated deterioration model. When it is determined that the deterioration model for the monotonic deterioration is correctly generated, the monotonic deterioration detection device 122 records the generated deterioration model and ends the learning phase. The information processing system 1*a* performs a process in an execution phase using the recorded deterioration model.

Figure 16:
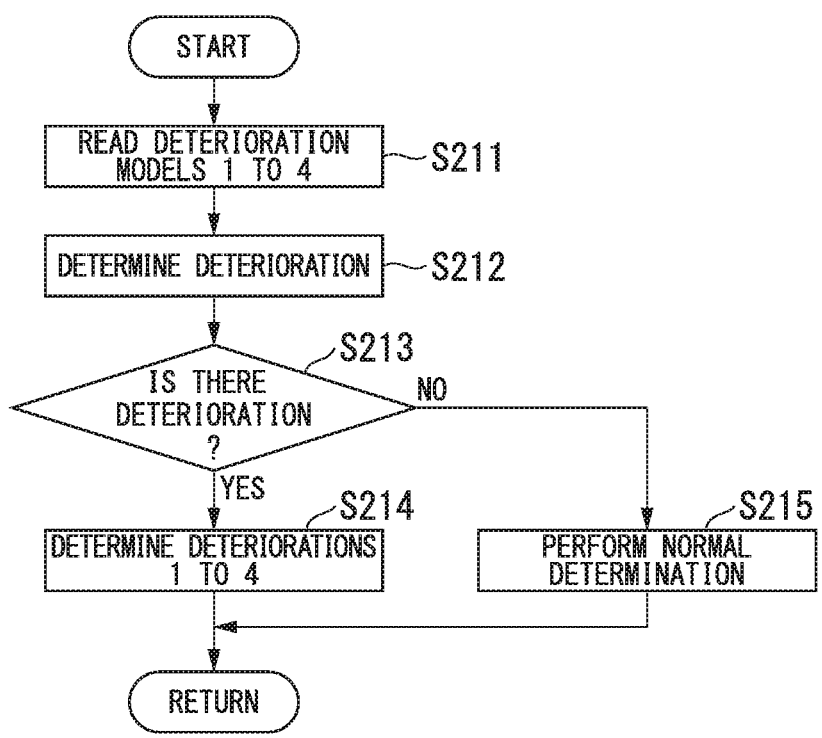
FIG. 16 is a flowchart for describing an example of an operation of an execution phase when the information processing system according to the embodiment is applied for a deterioration diagnosis.

Next, the operation of the determination process of Step S25 described with reference to FIG. 8 in an execution phase when the information processing system 1*a* is applied for a deterioration diagnosis will be described using FIG. 16. FIG. 16 is a flowchart for describing an example of an operation of an execution phase when the information processing system according to the embodiment is applied for a deterioration diagnosis.

In FIG. 16, the information processing system 1*a* (the determination device 110) reads generated deterioration models (a normal model to deterioration model 1) from the deterioration model storage device 123 in a learning phase (Step S211).

After the process of Step S211 is performed, the information processing system 1*a* applies the read deterioration model to acquired state data and determines whether there is deterioration (Step S212). In the case of monotonic deterioration, application of a deterioration model to state data is performed in an order of a normal model→deterioration model 4→deterioration model 3→deterioration model 2→deterioration model 1.

When it is determined that there is deterioration (Step S213: YES), the information processing system 1*a* determines deterioration 1 to deterioration 4 through determination using deterioration model 4 to deterioration model 1 (Step S214). In the case of monotonic deterioration, determination is usually performed in an order of deterioration model 4→deterioration model 3→deterioration model 2→deterioration model 1. However, for example, when an acquisition period of state data is long relative to progress of deterioration, some of the deterioration may not be determined, and thus next level deterioration may be determined in some cases.

On the other hand, when it is determined that there is no deterioration (Step S213: NO), the information processing system 1*a* performs normal determination (Step S215). After the process of Step S214 is performed or after the process of Step S214 is performed, the information processing system 1*a* ends the determination process of Step S25 illustrated in the flowchart of FIG. 16.

Figure 17:
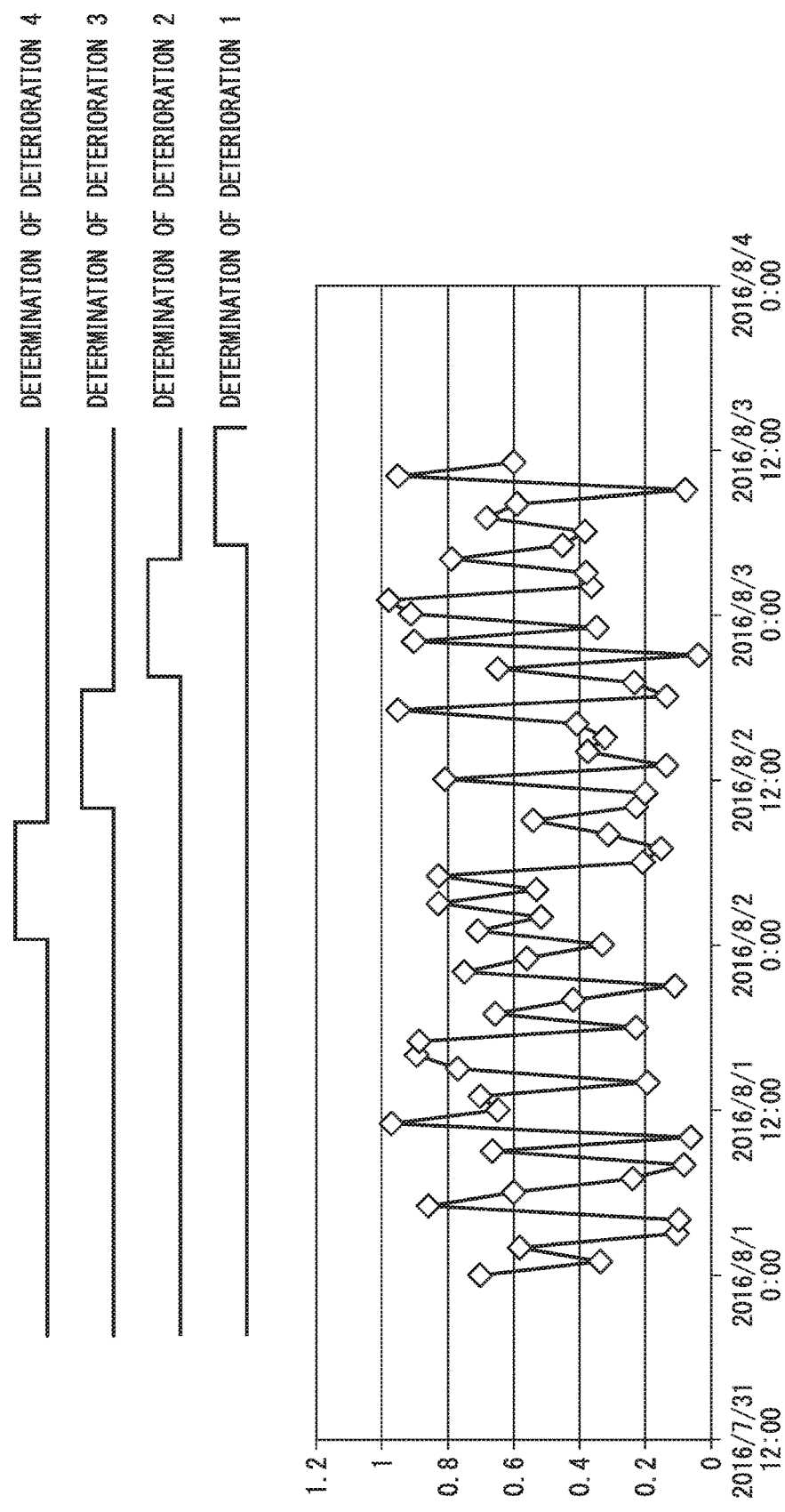
FIG. 17 is a diagram illustrating an example of a determination result in the execution phase when the information processing system according to the embodiment is applied for a deterioration diagnosis.

Next, a determination result in the execution phase when the information processing system 1*a* is applied for the deterioration diagnosis will be described using FIG. 17. FIG. 17 is a diagram illustrating an example of the determination result in the execution phase when the information processing system according to the embodiment is applied for a deterioration diagnosis.

In FIG. 17, a horizontal axis of a graph indicates time and a vertical axis thereof indicates a value of state data. Note that a graph which is the same as the graph used in the learning phase described with reference to FIG. 15 is used as the graph illustrated in FIG. 17 for ease of explanation.

In the execution phase, the information processing system 1*a* determines state data acquired at about 20 hours on Aug. 1, 2016 to 6 hours on Aug. 2, 2016 to be "deterioration 4" on the basis of deterioration model 4 and outputs a determination result. Similarly, the information processing system 1*a* determines "deterioration 3" on the basis of deterioration model 3, determines "deterioration 2" on the basis of deterioration model 2, and determines "deterioration 1" on the basis of deterioration model 1 over time, and outputs a determination result.

In the embodiment, determination regions of state data in which determination is performed using deterioration models are set such that the determination regions thereof do not overlap. However, determination regions of state data in which determination is performed using deterioration models may be set such that the determination regions thereof overlap.

As described above, the information processing system according to the embodiment can include a state data acquisition device configured to acquire state data indicating an operation state of a plant; a first classification device configured to generate a determination line used to classify the state data; a mirror image data generation device configured to generate mirror image data obtained by mirroring the acquired state data using the generated determination line; and a second classification device configured to generate a determination model on the basis of the state data and the generated mirror image data to generate a determination model used to determine operating conditions of the plant using machine learning and improve versatility thereof.

Note that each of the above-described information processing systems 1 may be a device having the above-described functions and may be implemented by, for example, a system which is constituted of a combination of a plurality of devices and in which devices are connected to each other to be able to communicate with one other. Furthermore, the information processing system 1 may be implemented as a part of functions of the operation control device 4, the maintenance device 6, or the field operator terminal 7 which is described with reference to FIG. 1. Note that the manufacturing execution system 3 and the operation control device 4 may also be implemented by a system which is constituted of a combination of a plurality of devices and in which devices are connected to each other to be able to communicate with one another like the information processing system 1.

Also, an information processing method according to the embodiment can include: a state data acquisition step of acquiring state data indicating an operation state of a plant; a first classification step of generating a determination line used to classify the state data; a mirror image data generation step of generating mirror image data obtained by mirroring the acquired state data using the generated determination line; and a second classification step of generating a determination model on the basis of the state data and the generated mirror image data to generate a determination model used to determine operating conditions of the plant using machine learning and improve versatility thereof.

Note that an execution order of the above-described steps in the information processing method according to the embodiment is not limited to a described order of the above-described steps and may be executed in any order.

A program configured to implement functions constituting the device described in the embodiment is recorded on a computer readable recording medium and the program recorded on the recording medium is read into a computer system and executed so that the above-described various processes of the embodiment may be performed. Note that the "computer system" mentioned herein may include an operating system (OS) and hardware such as peripheral devices. Furthermore, the "computer system" is also set to include a home page providing environment (or a display environment) as long as the "computer system" uses a world wide web (WWW) system. The "computer readable recording medium" refers to a storage device such as a non-volatile memory capable of writing such as a flexible disk, a magneto-optical disk, a ROM, and a flash memory, a portable medium such as a compact disk (CD)-ROM, and a hard disk built into a computer system.

The "computer readable recording medium" is also set to include a medium configured to hold a program for a certain period of time like a volatile memory (for example, a dynamic random access memory (DRAM)) inside a computer system serving as a server and a client when the program is transmitted over a network such as the Internet and a communication circuit such as a telephone line. Furthermore, the above-described program may be transmitted from a computer system configured to store the program in a storage device or the like to another computer system via a transmission medium or through transmission waves in the transmission medium. Here, the "transmission medium" configured to transmit a program is a medium having a function of transmitting information like a network such as the Internet (a communication network) and a communication circuit (a communication line) such as a telephone line. Furthermore, the program may be used to implement some of the above-described functions. In addition, the program may be a so-called difference file (difference program) configured to realize the above-described functions using a combination with a program which is already recorded in a computer system.

As used herein, the following directional terms "front, back, above, downward, right, left, vertical, horizontal, below, transverse, row and column" as well as any other similar directional terms refer to those instructions of a device equipped with the present invention. Accordingly, these terms, as utilized to describe the present invention should be interpreted relative to a device equipped with the present invention.

The term "configured" is used to describe a component, unit or part of a device includes hardware and/or software that is constructed and/or programmed to carry out the desired function.

Moreover, terms that are expressed as "means-plus function" in the claims should include any structure that can be utilized to carry out the function of that part of the present invention.

The term "unit" is used to describe a component, unit or part of a hardware and/or software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. An information processing system comprising:
a state data acquisition device configured to acquire, from a plurality of sensors having different degrees of deterioration in plant, state data indicating an operation state of the plant;
a first classification device configured to generate a determination line used to classify the state data;
a mirror image data generation device configured to generate mirror image data obtained by mirroring the acquired state data using the generated determination line and to add the generated mirror image data to the acquired state data to cancel out an influence of different conditions for measurement in the acquired state data; and
a second classification device configured to generate a determination model on the basis of the state data and the generated mirror image data.

2. The information processing system according to claim 1, further comprising:
a determination device configured to determine a deterioration or failure of one of the plurality of sensors based on the state data using and the generated determination model, and to generate a determination result diagnosing the deterioration or failure of the one of the plurality of sensors; and
a determination result output device configured to output the generated determination result.

3. The information processing system according to claim 1, wherein the first classification device classifies the generated mirror image data to generate the determination line, and the mirror image data generation device generates mirror image data obtained by mirroring the mirror image data using the generated determination line generated by classifying the mirror image data.

4. The information processing system according to claim 1, further comprising:
a set conversion device configured to convert the acquired state data into a set for each time,
wherein the first classification device generates the determination line used to classify the converted set of state data.

5. The information processing system according to claim 4, wherein the set conversion device converts state data acquired in time series into a set obtained by superimposing the state data at regular intervals.

6. The information processing system according to claim 1, further comprising:
a sampling device configured to sample the acquired state data,
wherein the first classification device generates the determination line used to classify the sampled state data.

7. An information processing system comprising:
a state data acquisition device configured to acquire from a sensor having deterioration over time in a plant, state data indicating an operation state of the plant;
a set conversion device configured to convert the acquired state data into a plurality of sets of acquired state data based on a time of acquisition; and
a classification device configured to generate a determination model on the basis of sets of acquired state data that have a same time of acquisition over a predetermined cycle among the plurality of sets of acquired state data.

8. The information processing system according to claim 7, wherein the set conversion device is configured to convert state data acquired in time series into sets of acquired state data having the same time of acquisition by superimposing the state data at regular intervals.

9. An information processing method comprising:
acquiring, from a plurality of sensors having different degrees of deterioration in a plant, state data indicating an operation state of the plant;
generating a determination line used to classify the state data;
generating mirror image data obtained by mirroring the acquired state data using the generated determination line and adding the generated mirror image data to the acquired state data to cancel out an influence of different conditions for measurement in the acquired state data; and
generating a determination model on the basis of the state data and the generated mirror image data.

10. A non-transitory computer readable storage medium that stores a computer-program comprising computer-readable instructions, when executed by one or more computers, to perform an information processing method comprising:
acquiring, from a plurality of sensors having different degrees of deterioration in a plant, state data indicating an operation state of the plant;
generating a determination line used to classify the state data;
generating mirror image data obtained by mirroring the acquired state data using the generated determination line and adding the generated mirror image data to the acquired state data to cancel out an influence of different conditions for measurement in the acquired state data; and
generating a determination model on the basis of the state data and the generated mirror image data.

* * * * *